Jan. 29, 1946.   A. M. MOEN   2,393,698
COMPASS
Filed Sept. 18, 1943   2 Sheets-Sheet 2
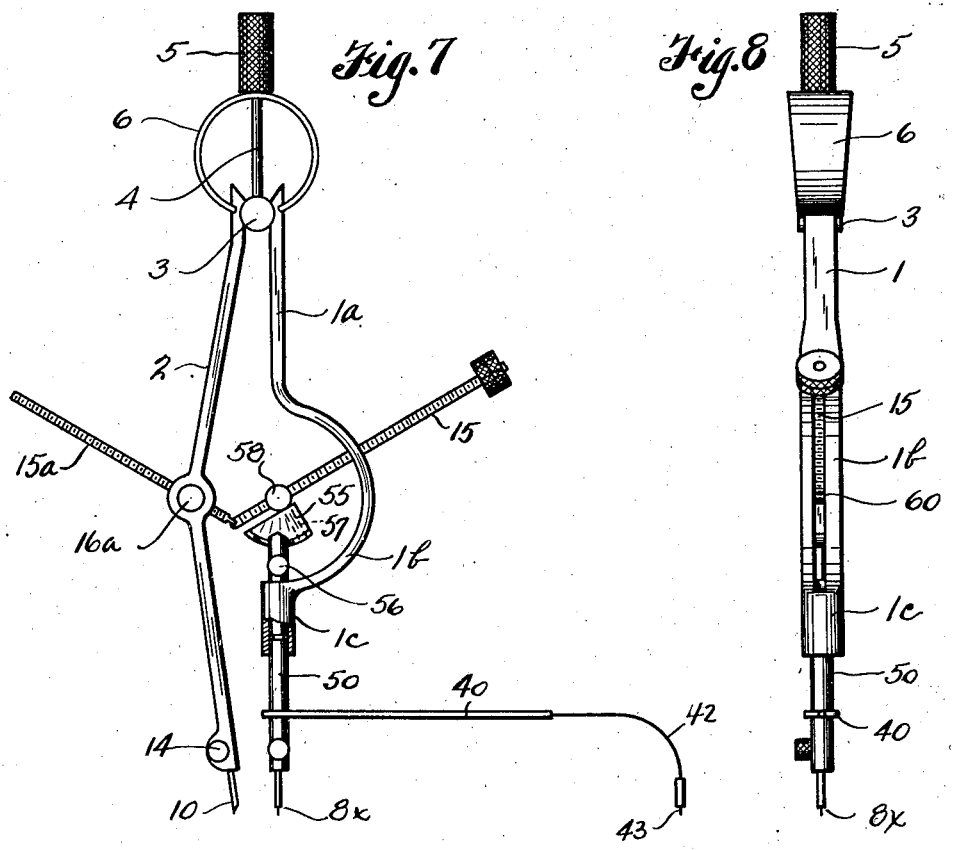
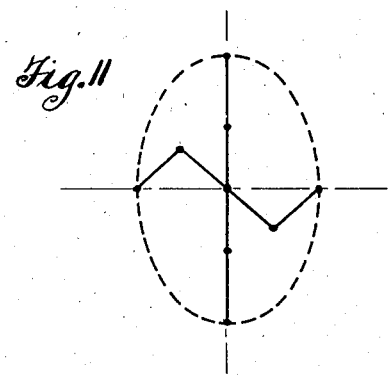
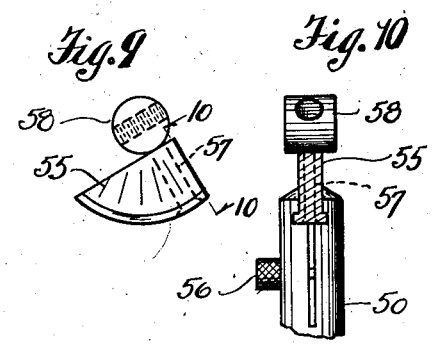
INVENTOR
ALFRED M. MOEN
BY
Cook & Robinson
ATTORNEY Patented Jan. 29, 1946

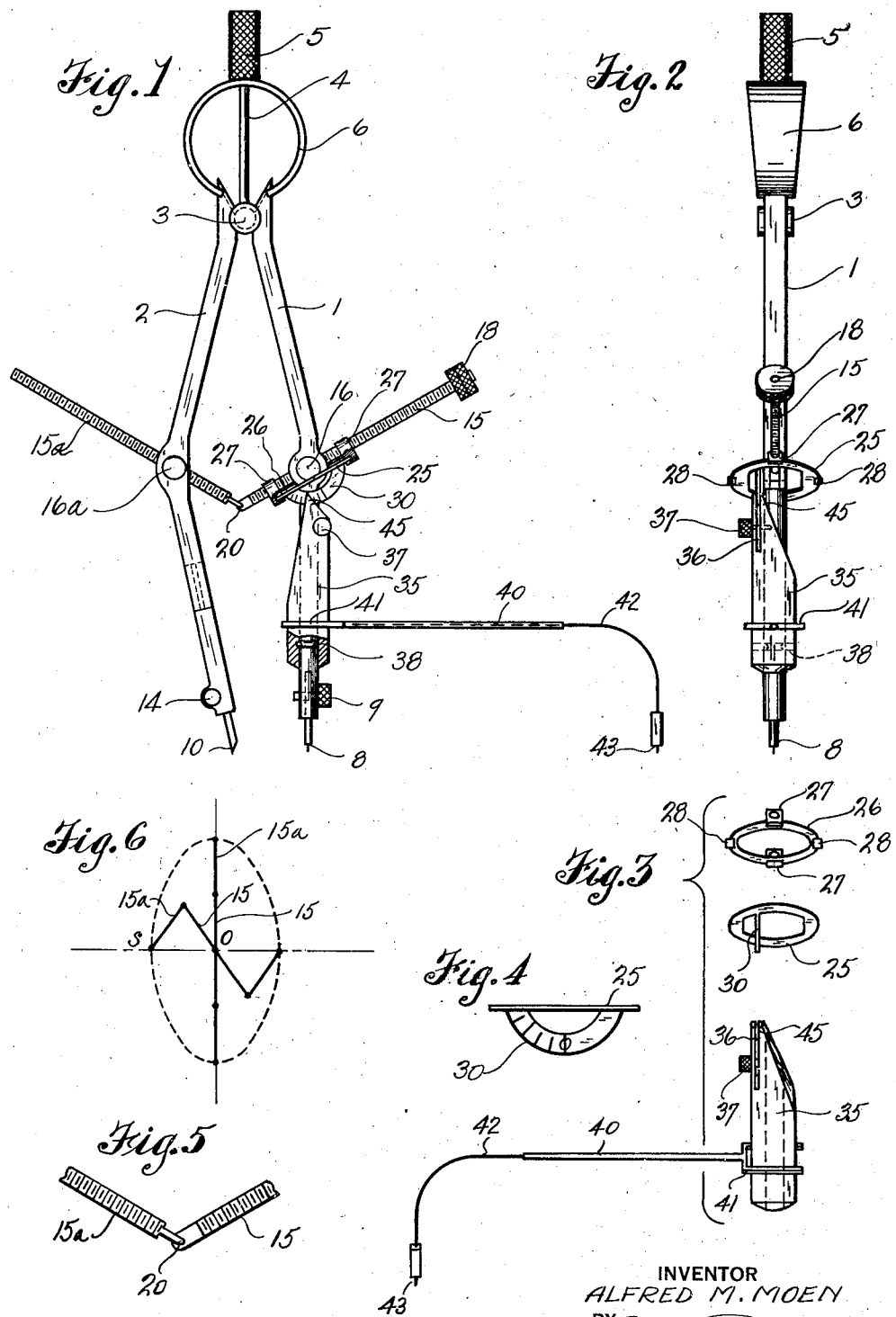

2,393,698

UNITED STATES PATENT OFFICE 2,393,698

COMPASS

Alfred M. Moen, Seattle, Wash.

Application September 18, 1943, Serial No. 502,873

7 Claims. (Cl. 33—30)

This invention relates to drafting instruments, and has reference more particularly to improvements in compasses; it being the principal object of this invention to provide a compass that may be used for the making of ellipses, as well as for making circles.

More specifically stated, it is the object of the invention to provide a compass that is of the general character of the ordinary types of compasses used by draftsmen for the drawing of circles, and which is adapted to that use, and in addition is equipped with special means whereby, in a manner of operation similar to that of drawing a circle, it can be employed to draw an ellipse. Furthermore, the special means provided for adapting the compass to the drawing of an ellipse can be adjusted to produce ellipses having minor and major axes of varying lengths within the limits provided by the spread of the compass.

It is also an object of the invention to provide means for determining the relative lengths of major and minor axes of the ellipse to be drawn; this means including as a part thereof an adjusting screw for determining and regulating the spread of the legs of the compass and which screw comprises hingedly joined sections that, through their connection with the legs and with an adjustable annular guide of special arrangement, may be caused to adjust themselves between an angular and straight alinement, as the compass is turned, thus to change the spread of the legs of the compass as it is turned, to form the ellipse.

Other objects of the invention are to be found in the details of construction and combination of special parts, and in their mode of use as applied to the compass, as will hereinafter be fully described.

In accomplishing these and other objects of the invention, I have provided the improved details of construction, the preferred forms of which are illustrated in the accompanying drawings, wherein—

Fig. 1 is a side view of a compass equipped with means embodied by this invention, as set for the drawing of an ellipse.

Fig. 2 is a view of the compass as seen from the right-hand side as shown in Fig. 1.

Fig. 3 is a perspective view of parts of the instrument, shown in disconnected relationship for better understanding.

Fig. 4 is a side view of the tiltable disk whereby relationship of the ellipse axes is determined.

Fig. 5 is an enlarged detail showing the hinge connection of the complemental parts of the compass adjusting screw.

Fig. 6 is a view diagrammatically illustrating the angular change of the hinged parts of the adjusting screw as the compass is turned in forming the ellipse.

Fig. 7 is a side view of a compass of an alternative type of construction.

Fig. 8 is an edge view of the same.

Fig. 9 is an enlarged side view of the angle adjusting element of the compass.

Fig. 10 is a section on line 10—10 in Fig. 9.

Fig. 11 is a diagram illustrating the action of the jointed adjusting screw of the compass in drawing an ellipse.

With the understanding that an ellipse as generally drawn by a draftsman in mechanical drawings, is a projection of a circle onto a plane that is at an angle to the plane of the circle, and that its minor axis may vary between zero to the approximate length of the major axis, it will be apparent then that an instrument for the present uses and of the present kind, to be of any practical value to a draftsman, should be capable of being easily and readily adjusted for the drawing of ellipses of various size and also of various dimensions; that is, with reference to the proportionate lengths of their major and minor axes. Also, such an instrument should be capable of drawing a true ellipse, as distinguished from the usual draftsman's ellipse, which is made by forming two circularly curved lines about spaced centers to define the ends of the ellipse, then joining these by two circularly curved arcs, formed about centers that are located in a line that bisects the line of the first mentioned centers at a right angle.

So, the present instrument has been designed with the thought in mind that it should be of a type and character permitting the drawing of ellipses in the same way as the ordinary drafting compass is used for drawing circles, and providing that the size of the ellipse and proportionate lengths of its major and minor axes be readily established and the position of the ellipse on the paper or surface, be accurately located.

Referring more in detail to the drawings—

The present device, as shown best in Fig. 1, comprises the two compass legs 1 and 2 that are hinged together at their upper ends, as at 3, permitting them to be spread apart to a greater or lesser extent at their free ends. Extending upwardly from the hinge 3 is a handle portion comprising a vertical stem 4 equipped at its upper end with a knurled head 5. A spring metal bow 6 is mounted on this stem, and its opposite ends engage in notches in short extension portions of the legs, above the hinge, to urge the legs apart at their free ends. The head 5 serves as a means whereby to hold the compass in use.

One leg is split at its lower end and equipped with a removable, pointed center pin 8, to be held in place by a clamp screw 9, as is general practise. The other leg mounts a lead or marker 10, and this likewise is held in place by a clamp screw 14.

The legs 1 and 2, as here shown, are slightly bowed apart to provide necessary clearance for the parts that are added for the making of the ellipse. It is to be understood, however, that the particular detail of the compass insofar as it concerns the hinge connection 3, the handle portions 4, 5 and 6, and the special shape of legs and means for mounting the part 8 and lead 10, is of no special importance, so long as consistent with the objects of the invention.

The spread of the compass legs is determined by an adjusting screw shown best in Fig. 1. The screw comprises two complemental portions 15 and 15a, that are formed with right and left hand threads, respectively, and these are threaded through pivot bearings 16 and 16a mounted in the legs 1 and 2 about midway between their lower ends and the connecting hinge. The adjacent ends of the two sections of the adjusting screw are hinged together, as at 20, and the hinge is adapted to break downwardly, as shown in Fig. 1. The section 15 of the adjusting screw has a knurled head, or nut 18 at its outer end whereby it may be axially rotated, thus to determine the spread of the legs 1 and 2 and the length of the major axis of the ellipse or the radius of a circle to be drawn. One important detail of the present construction is that the axis of shaft 15 intersects the axis of the pivot bearing 16 at a right angle.

Encircling the leg 2 just below the pivot axis 16, is an annular plate 25. This is disposed in a plane that is parallel to and just below the axes of shaft 15 and pivot 16. Disposed concentrically upon plate 25 is a flat ring 26 of like diameter, and this ring, at diametrically opposite points, has blocks 27—27 fixed thereon, through which the shaft 15 extends, and at points on the ring medial of the blocks, the ring 26 is equipped with guides 28—28 which, like the blocks 27, slidingly embrace the peripheral edges of the annular plate 25 to keep the parts 25 and 26 centered.

Fixed to the under side of the plate 25, at one side of its center and perpendicular to its plane and parallel to the shaft 15, is an arcuate segment 30, marked in degrees with respect to the axis of pivot 16.

Rotatably mounted on the lower end portion of the leg 2 is a sleeve 35 held by a key 38 against longitudinal shifting on the leg. At its upper end, this sleeve has a longitudinal slot 36 within which the arcuate segment 30 is received and in which the segment moves when the pivot bearing 16 turns in its mounting with the change in angular relationship of the screw sections 15 and 15a. A clamp screw 37 is threaded through the split portion of the sleeve and may be tightened to clamp the segment against movement therein and thus retain the annular plate 25 at a set position relative to the sleeve. The annular plate 25 is so supported by the screw section 15 that the arc segment 30 fixed thereto is centered relative to the axis of pivot 16.

Extending laterally from the sleeve is a tubular arm 40. At one end, this arm has a bifurcated head 41 fitted to the squared exterior of the sleeve. Telescoped within the outer end of the arm is a wire shaft 42 with a downturned outer end point 43 adapted to be engaged with the paper or surface on which the ellipse is to be drawn, thus to hold the sleeve from turning when the compass is turned as in drawing a circle.

As seen in Fig. 1, the upper end of the sleeve is tapered to a point, as at 45, and this point is used in conjunction with the angle graduations or markings on the segment 30 to designate the length proportion of the axes of the ellipse. When the telescopic fork is removed, the compass will draw true circles. When the telescopic fork is installed, the compass will draw true circles only when the disk is set at 90° to the axis of the stationary block. If the pointer registers with the 45° mark, then the parts are set for the drawing of an ellipse which would correspond to the projection of a circle onto a plane at an angle of 45° to the plane of the circle. Likewise, when at other markings, the angle of projection is indicated.

To use the compass for drawing an ellipse, first the clamp screw 37 is loosened to permit freedom of movement of the segment 30 in slot 36 for the pivotal movement of the annular parts for bringing the hingedly joined sections of the adjusting screw into axial alinement, as is required for making an adjustment in spacing of the compass legs. Then the annular disk is tilted, through use of screw 15 as a handle, to the desired angular position as determined by the position of the pointer 45 on the graduated segment 30, whereby to form the ellipse having major and minor axes of the desired proportionate lengths or to form the projection of a circle onto a plane at a designated angle relative to the plane of the circle. Then the clamp screw 37 is set tight to hold the angular setting of the disk. Such an angular setting is shown in Fig. 1.

As the disk is tilted to the desired angular position, the two hingedly joined sections of the screw will assume an angular reliatioship that establishes a marking radius for the compass equal to one-half the length of the minor axis of the ellipse that is to be drawn. Then, with the point 8 set at the ellipse center, and the marker 10 set on the line of the minor axis of the ellipse, the point 43 is set in the surface, also in the line of the minor axis of the ellipse, and all is then ready to form the ellipse. The compass is then turned by means of the knob 5 in such manner as required to cause the lead 10 to mark the ellipse.

Assuming that Fig. 1 shows the compass at a starting position, it will be understood that as it is turned in either direction, the guides 27 and 28 slide along the periphery of the disk 25 which is held against rotation through connection with sleeve 35. Thus, after a turn of 90°, the adjusting screw sections are brought into horizontal alinement, and the spread of the legs 1 and 2 is increased to the maximum as provided for by the screw adjustment at that time.

This movement of the sections of the adjusting screw from angular position, as in Fig. 1, to alined position, and the resultant increase in spread of the compass legs, is diagrammatically shown in Fig. 6. In this view, the radial distance from point O to point S designates the marking radius from part 8 to lead 10, and the heavy lines 15 and 15a, at the left, designate the sections of the adjusting screw as set in Fig. 1 for starting the drawing of an ellipse. With the turning of the compass in either direction from point S, the sections of the screw will move toward alinement and as they reach one-quarter turn, they are in alined position, and the marking radius has reached its maximum. Thus, the mark made by the lead 10 will form a true ellipse when a complete turn has been made.

It is anticipated that in lieu of the hinge connection 20, this might be a universal joint and thus adjustment of the screw for spreading or contracting the legs could be made at any angular position fo the screw sections. In such case, it would be possible to adjust the starting radius after the parts had been adjusted to the position of Fig. 1, and this would be equal to one-half the length of the minor axis.

It is anticipated that various ways might be devised for mounting the disk 25 and for holding it in adjusted position, but the feature of importance is that the disk can be held stationary, in any set position, and that the hinged sections of the adjusting screw will effect that change in spread of the compass legs, as the compass is turned, required to form a true ellipse.

In the alternative form of construction illustrated in Figs. 7 to 10, the main compass parts are substantially like those of the device of Fig. 1 and bear corresponding reference numerals, except that the leg 1A which here corresponds to leg 1 of the first described compass, is formed with an outwardly turned bend 1B terminating at its lower end in a bearing 1C in which an extension shaft 50 is revolubly mounted. The extension shaft 50 has a point 8x at its lower end, and the holding arm 40 is here applied to the shaft 50 in the same manner and for the same purpose that it is applied to the part 35 in the device of Fig. 1. When the point 43 at the end of the arm 40 is applied to a surface, the shaft 50 will be held against rotation and the compass may be rotated thereabout, turning on the bearing 1c.

At the upper end of the shaft 150, an arcuate member 55 is adjustably held by a clamp screw 56. The arcuate member is supported in a plane that lies within the axial line of the shaft 50, and rotatably fixed in the arcuate member is a post 57 which at its upper end mounts a bearing block 58 through which the section 15 of the adjusting screw is threaded. The outer portion of the screw 15 is contained in a longitudinal slot 60 that is formed in the outwardly bowed portion 1B of the leg 1, and the screw may move freely up and down in this slot. The member 55 is so held and guided by the shaft 50 that the axis of the bearing member 58 intersects the axial line of the shaft 50. If the arcuate plate 55 is adjusted about its center from the position in which it is shown in Fig. 7, so as to bring the pivot 57 into coaxial alinement with the shaft 50, then the two sections of the adjusting screw will be brought into axial alinement.

Any adjustment of the arcuate member that moves the post 57 away from this position of alinement, will set the screw parts 15 and 15a for the formation of an ellipse, and the extent of this movement away from alinement with shaft 50 determines the angle of projection of the ellipse.

By referring to Fig. 7, it will be understood that with the parts in that position, and the shaft 50 held against rotation, turning of the compass will cause the bearing 58 to turn accordingly and as it turns, the sections of the adjusting screw will be brought toward alinement, and after a one-quarter turn has been made, they are moved back toward the position shown in Fig. 7, thus forming the line of an ellipse, as has been previously described.

Having thus described my invention, what I claim as new therein and desire to secure by Letters Patent is:

1. A compass of the character described having a pair of hingedly joined legs, one leg being equipped with a center point and the other with a marking element, an adjusting screw joining the legs for determining the marking radius; said screw comprising two sections with ends thereof hingedly joined between the legs, a member applied to that leg of the compass that carries the center point, for rotation of the leg therein, means for holding said member against rotation as the compass is turned said member having a plane surface surrounding the leg; and adjustable to change the angle of the plane surface relative to the leg axis and means on the corresponding section of the adjusting screw movable in contact with said plane surface of the member in a circle about the point of intersection of the plane and leg axis as the compass is turned, to cause change in angular relationship of the screw sections to change the spread of the compass legs accordingly for the marking of an ellipse.

2. An ellipse compass having a pair of hingedly joined legs, a marking instrument carried by the first leg, a center point carried by the second leg, an adjusting screw joining the legs for determining a marking radius; said screw comprising two sections adjustably joining the legs and with ends hingedly joined between the legs, a sleeve applied to the second leg for its rotation therein, a stationary guide having a flat surface, mounted by the sleeve and encircling the leg axis and adjustable to locate the flat surface in various planes of inclination relative thereto, and means applied to the corresponding section of the adjusting screw to move in contact with the disk about the leg axis as the compass is turned to cause the hinge sections of the adjusting screw to change their angular relationship accordingly for the scribing of the ellipse.

3. An ellipse compass having a pair of hingedly joined legs, a marking instrument carried by the first leg, a center point carried by the second leg, an adjusting screw joining the legs for determining a marking radius; said screw comprising two sections adjustably joining the legs and with ends hingedly joined between the legs, a sleeve applied to the second leg for its rotation therein, a stationary guide having a flat surface, mounted by the sleeve and encircling the leg axis and adjustable to locate the flat surface in various planes of inclination relative thereto, and means applied to the corresponding section of the adjusting screw to move in contact with the disk about the leg axis as the compass is turned to cause the hinge sections of the adjusting screw to change their angular relationship accordingly for the scribing of the ellipse, and means associated with the sleeve to engage the scribing surface to hold the sleeve against rotation with the compass leg.

4. An ellipse compass having a pair of hingedly joined legs, a scribing element carried by the first leg, a center point carried by the second leg, pivot bearings mounted in the legs, an adjusting screw for determining spread of the legs comprising right and left threaded sections applied respectively through the pivot bearings and having adjacent ends hinged together between the legs, a sleeve rotatably fitted to the second leg, an annular guide member held by the sleeve to encircle the corresponding leg axis and adapted to be tilted and secured by the sleeve at different angles of inclination relative to the leg axis, means applied to the corresponding section of the adjusting screw for following the annular member as the compass is turned, to cause the hinged sections of the screw to change accordingly from their angular relationship to axial alinement for the scribing of an ellipse.

5. A compass of the character described comprising a pair of hingedly joined legs equipped respectively with a center point and a marking element, an adjusting screw joining the legs and comprising two sections with a universal joint connection between the legs for turning the sections in unison and held in pivot bearings associated with the legs, a sleeve associated with the leg that carries the center point, means on the sleeve to engage the marking surface to hold the sleeve against rotation as the compass is turned about the center point, a guide member mounted by the sleeve and containing one section of the screw therein and supported for rotation with the compass about an axis that intersects the axial line of the sleeve at an angle whereby, in turning the compass as in scribing a circle, the sections of the screw are caused to move from an axially alined relationship to a predetermined angular relationship and then returned to alinement thereby to cause a continuous change in the marking radius for defining an ellipse.

6. A compass of the character described comprising a pair of hingedly joined legs equipped respectively with a marking element and a center point carrier about which latter the compass leg turns in scribing a curve, a guide member mounted by the center point carrier in alinement therewith, an adjusting screw joining the legs to determine their spread and comprising two sections with ends universally joined between the legs through which the sections may be turned in unison, and with one section threaded through the guide member; said guide member having a mounting stem rotatable about an axis that is disposed at an angle to the carrier axis whereby, on rotation of the compass as in making a circle, the sections of the screw are caused to automatically adjust themselves between an axially alined relationship and a predetermined angular relationship to scribe an ellipse.

7. A device as recited in claim 6 wherein the stem of said guide member is rotatable in a mounting segment that is adjustably carried in the center point carrier whereby to change the angle of the stem axis relative to the carrier axis for determining the relationship of length of the minor axis to the major axis of the ellipse for any setting of the adjusting screw.

ALFRED M. MOEN.